United States Patent
Bracamonte et al.

(10) Patent No.: US 6,668,089 B1
(45) Date of Patent: Dec. 23, 2003

(54) PROCESS FOR CONTROLLING THE COMPRESSION RATIO OF DIGITAL IMAGES

(75) Inventors: Javier Bracamonte, Neuchâtel (CH); Frédéric Barman, Zug (CH); Michael Ansorge, Hauterive (CH); Fausto Pellandini, Cormondrèche (CH)

(73) Assignee: Asulab S.A., Bienne (CH)

(*) Notice: Subject to any disclaimer, the term of this patent is extended or adjusted under 35 U.S.C. 154(b) by 0 days.

(21) Appl. No.: 09/509,665

(22) PCT Filed: Sep. 28, 1998

(86) PCT No.: PCT/CH98/00413
§ 371 (c)(1),
(2), (4) Date: Jul. 14, 2000

(87) PCT Pub. No.: WO99/18734
PCT Pub. Date: Apr. 15, 1999

(30) Foreign Application Priority Data

Oct. 1, 1997 (FR) .............................. 97 12562

(51) Int. Cl.⁷ .......................... G06K 9/36; G06F 15/00; H04N 1/32
(52) U.S. Cl. ...................... 382/239; 382/251; 358/1.15; 358/426.07
(58) Field of Search ................................. 382/232, 239, 382/244, 251, 246; 358/1.15, 426.06, 426.07, 426.13, 426.14; 375/240.2, 240.23

(56) References Cited

U.S. PATENT DOCUMENTS

| | | | | |
|---|---|---|---|---|
| 5,379,122 A | * | 1/1995 | Eschbach | 382/248 |
| 5,410,352 A | * | 4/1995 | Watanabe | 375/240.03 |
| 5,489,943 A | * | 2/1996 | Kutner | 375/240.18 |
| 5,608,654 A | | 3/1997 | Matsunoshita | 358/1.15 |
| 5,937,100 A | * | 8/1999 | Kitajima | 382/251 |

OTHER PUBLICATIONS

Patent Abstracts of Japan, vol. 015, No. 510 (E–1149), Dec. 25, 1991 & JP 03 224363 A (Ricoh Co. Ltd), Oct. 3, 1991.

Patent Abstracts of Japan, vol. 097, No. 002, Feb. 28, 1997 & JP 08 275150 A (Nikon Corp), Oct. 18, 1996.

Patent Abstracts of Japan, vol. 016, No. 482, (E–1275), Oct. 7, 1992 & JP 04 175067 A (Toshiba Corp), Jun. 23, 1992.

* cited by examiner

Primary Examiner—Leo Boudreau
Assistant Examiner—Duy M. Dang
(74) Attorney, Agent, or Firm—Sughrue Mion, PLLC

(57) ABSTRACT

The present invention relates to a process for controlling the compression ratio of digital images.

This process consists of compressing a digitized image by means of a conventional process such as that known by the abbreviation JPEG. The compression ratio of the image is modified by modifying a parameter of the JPEG process, called the scale factor. According to the invention this scale factor is modified until the compression ratio obtained lies in a range of tolerance of the desired compression ratio. The process uses and approximation to the actual curve of the compression ratio as a function of the scale factor, in order to minimize the number of iterations needed to attain the desired compression ratio.

11 Claims, 4 Drawing Sheets

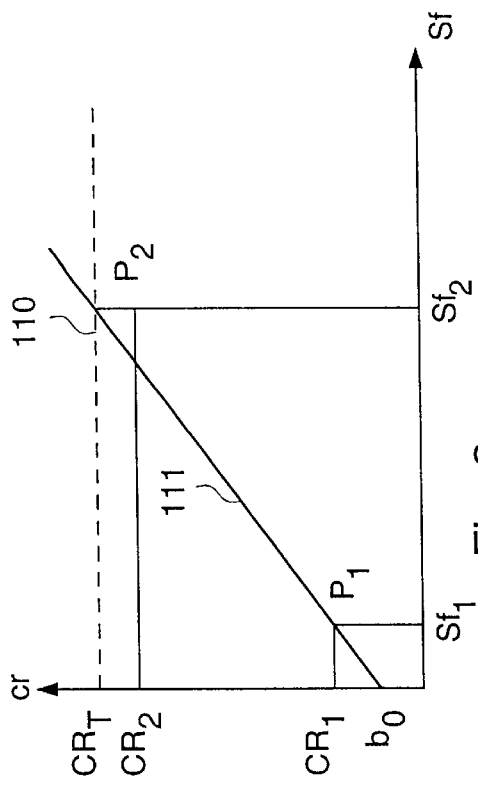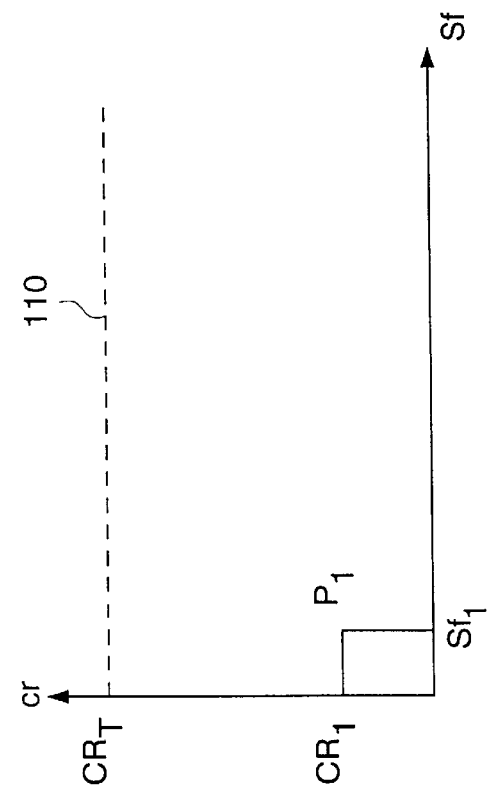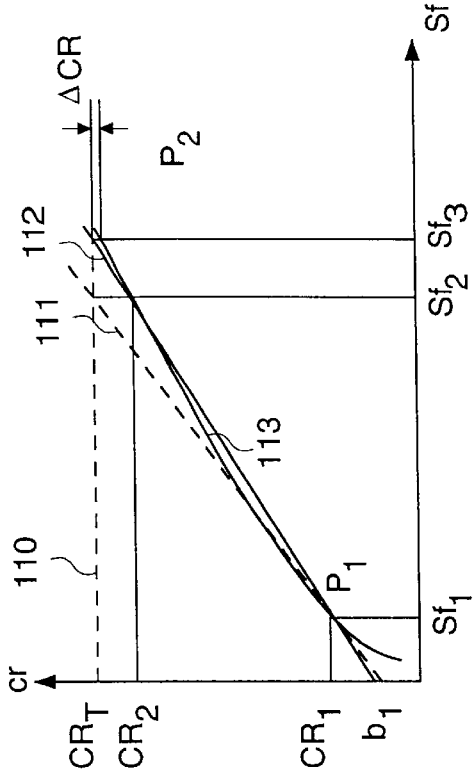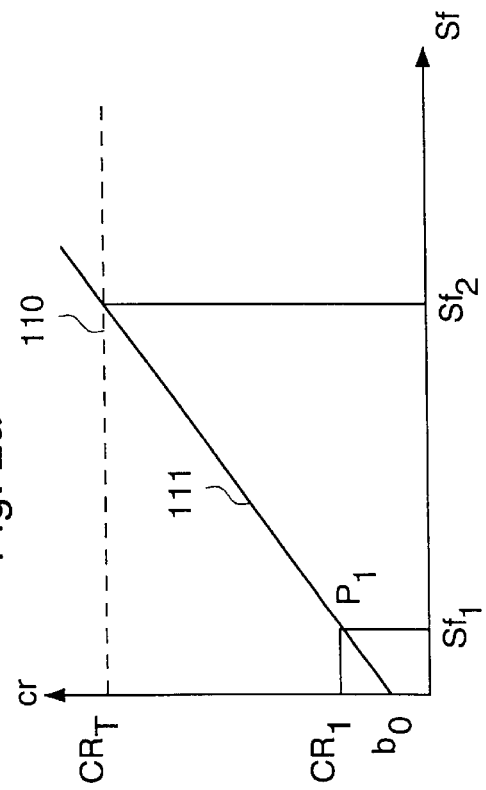

Fig. 4a
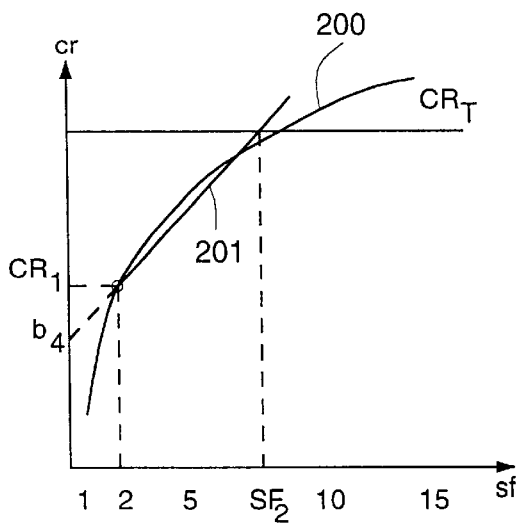
Fig. 4b
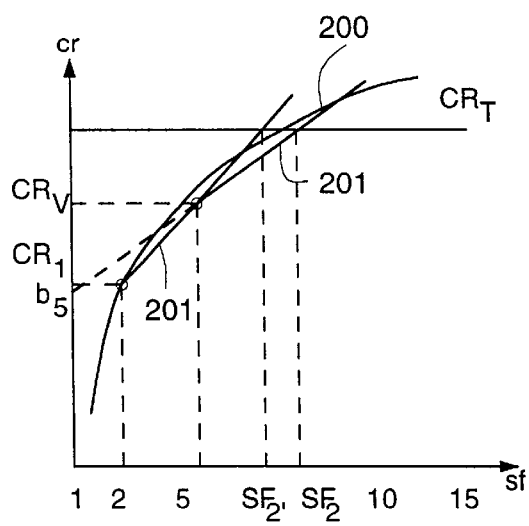
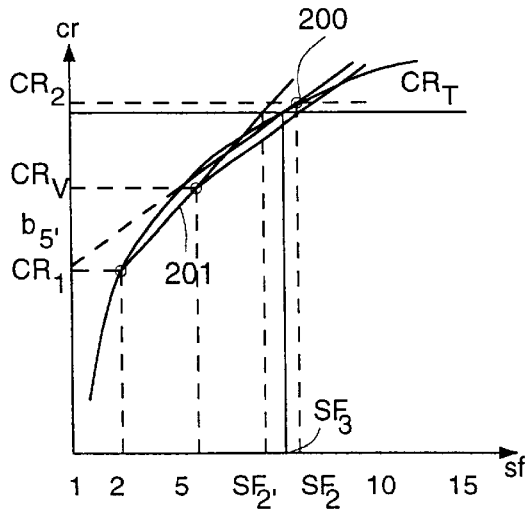
Fig. 4c
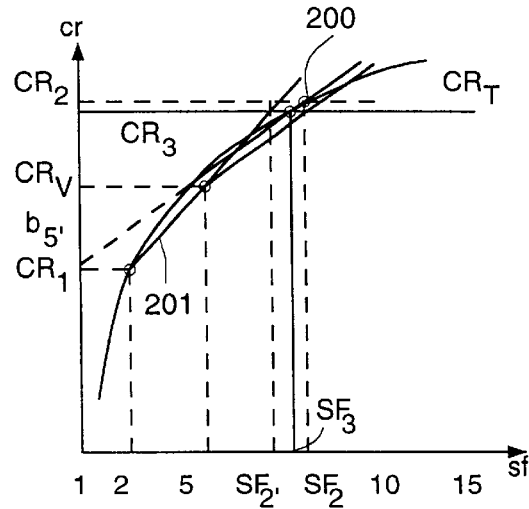
Fig. 4d

PROCESS FOR CONTROLLING THE COMPRESSION RATIO OF DIGITAL IMAGES

TECHNICAL FIELD

The present invention relates to a process for controlling the compression ratio of digital images.

BACKGROUND ART

The amount of digital images increases each year as new applications are found for them. However, an enormous amount of data is needed to represent a single digital image. Speaking generally, this amount of data is so large that storing and transmitting the images in their original representation is too costly and thus impractical, both from the point of view of the digital processing of the images and the economic point of view.

At present various image compression algorithms have been developed. A joint effort between the ITU (International Telecommunication Union) and the ISO (International Organisation for Standardization) has resulted in the creation of the compression standard for still images known under the name JPEG (Joint Photographic Expert Group). This algorithm is defined in "ITU-T Recommendation T.81, Digital Compression and Coding of Continuous-tone Still Images" (September 1992) and is fully illustrated in W. B. Pennebaker and J. L. Mitchell, "JPEG Still Image Compression Standard", Van Nostrand Reinhold, New York, N.Y., USA, 1993.

When using the JPEG algorithm the compression ratio, i.e. the number of bits in the un-compressed image divided by the number of bits in the compressed image varies as a function of the complexity of the image. Thus, for example, the compression ratio of an image of a sky with few clouds is twice or three times, even more, the compression ratio of an image of a crowd in a stadium, for a substantially identical quality of restitution.

In many applications it is desirable or necessary for the user and/or the system to be able to control the compression ratio of the acquired images. In an apparatus for recording digital views, such as a photographic apparatus, it is important to be able to foresee the size of the compressed images, in order to keep the allocation of the memory of the apparatus under control.

Controlling the compression ratio is also important in networks which transmit still images or sequences of images. In these networks the time specified for transmitting a compressed image is fixed, or restricted at least, and cannot exceed a certain value, which rules out use of coding schemes which do not have control over the compression ratio.

The present invention seeks to provide an image compression process in which it is possible to choose the compression ratio with excellent precision.

SUMMARY OF THE INVENTION

In order to achieve this object, the process according to the invention is characterized in that it comprises the steps of:

compressing a digital image by means of conventional process having at least one parameter allowing the compression ratio to be modified, i.e. the ratio of the size of the un-compressed image to the size of the compressed image, determining the compression ratio of the said conventional process, verifying whether the compression ratio lies in a range of tolerance of a value of a specified compression ratio, modifying said parameter if the compression ratio does not lie in the range of tolerance, and repeating the compression of the image until the compression ratio lies in the range of tolerance.

According to a preferred embodiment, the conventional compression process is the JPEG process and the parameter which is acted upon is a scale factor serving to modify the values of the normalization matrix used by the algorithm of the JPEG process.

In the process according to the invention an initial scale factor is advantageously defined, the JPEG process is applied a first time using the initial scale factor and said process is applied again with the scale factor being modified if the actual compression ratio does not lie in the range of tolerance of the specified compression ratio.

According to an advantageous implementation of the process, the scale factor is increased when the actual compression ratio is lower than the specified compression ratio and is decreased when the actual compression ratio is greater than the specified compression ratio.

The scale factor is advantageously modified as a function of an at least partially linear model representing the compression ratio as a function of the scale factor.

Preferably the actual compression ratio is determined using said initial scale factor, the curve representing the compression ratio as a function of the scale factor is approximated by a straight line having predetermined slope $m_0$ and passing through a point having the initial scale factor as abscissa and the actual compression ratio obtained by applying the JPEG process with the initial scale factor as ordinate, a scale factor is determined on the basis of the straight line approximation and of the specified compression ratio, the JPEG process is applied again using this new scale factor, it is verified whether the actual compression ratio lies in the range of tolerance of the specified compression ratio, the process is terminated if the actual compression ratio lies within this range, otherwise a new scale factor is determined on the basis of a straight line approximation to the curve of the actual compression ratio as a function of the scale factor.

According to a variant embodiment, the curve representing the actual compression ratio as a function of the scale factor is advantageously approximated by straight line segments having different slopes and forming a continuous curve.

BRIEF DESCRIPTION OF THE DRAWINGS

The present invention will be better understood with reference to two non-limiting embodiments of the invention and to the accompanying drawings, in which:

FIGS. 2a to 2d represent the compression ratio schematically at different steps of the process of FIG. 1;

FIG. 3 is a block diagram of a second embodiment of the process according to the invention and FIGS. 4a to 4d represent the compression ratio at different steps of the process of FIG. 3.

PREFERRED EMBODIMENTS

Figure 1:
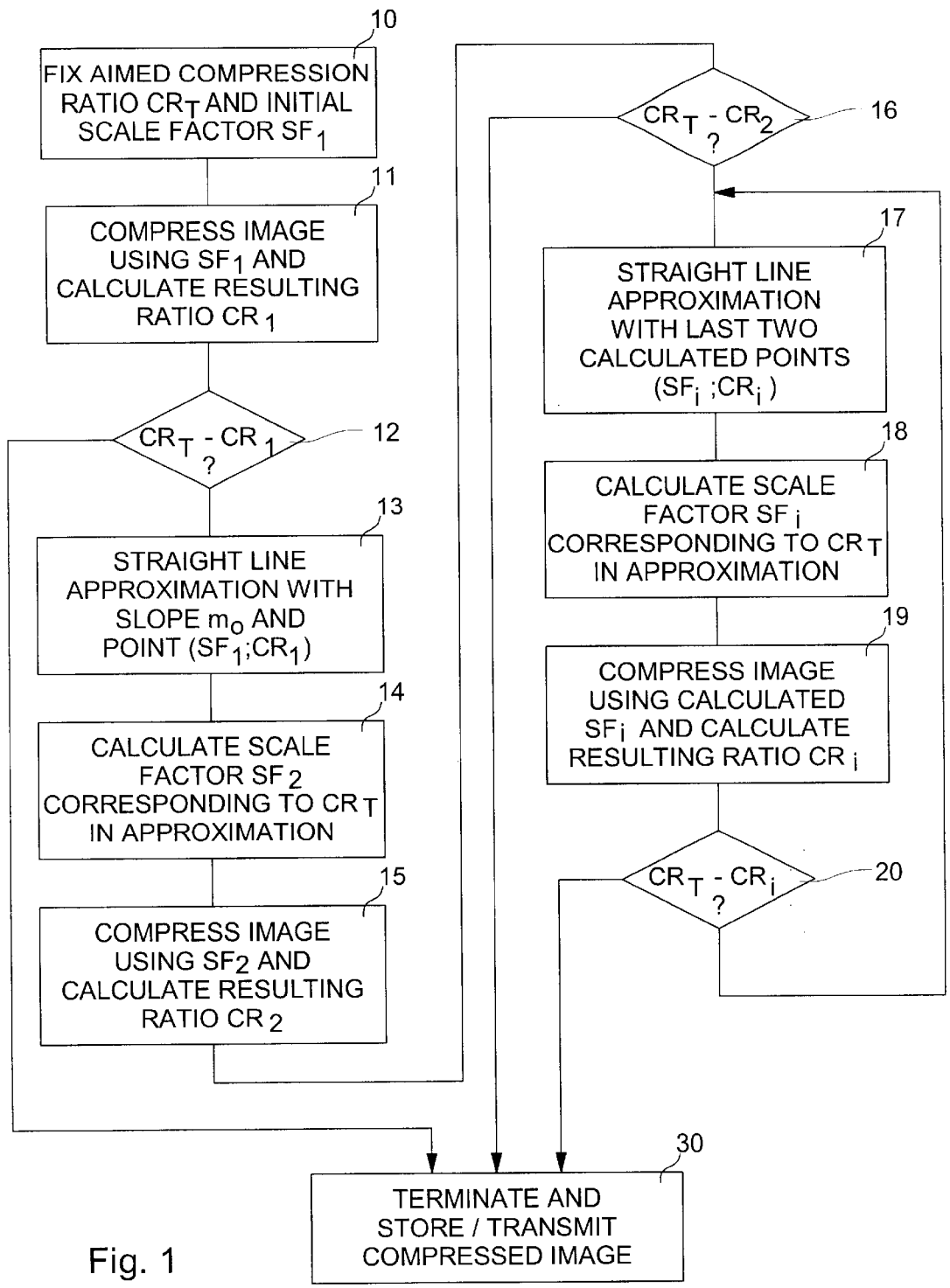
FIG. 1 is a block diagram illustrating a first embodiment of the process according to the invention.

The process according to the present invention is based on the JPEG algorithm and is entirely compatible therewith. The principle steps of this algorithm are defined below.

The image to be compressed is separated into blocks of 8×8 pixels. Each block is then processed separately in the identical way, in sequential manner. The steps of the process are described hereafter for one block of 8×8 pixels.

Each block is associated with a matrix of eight rows and eight columns, called the "matrix of a block" in the following.

This matrix is multiplied by the core of a linear transform known under the abbreviation 2D-DCT (2 dimension—Discrete Cosine Transform), such as is defined in the JPEG algorithm. This discrete cosine transform (DCT) converts the 8×8 pixels of the spatial domain into 8×8 coefficients in the frequency domain. The object of this transformation is to de-correlate the original data and redistribute the energy of the signal between a small number of coefficients, in the part of the low frequencies of the spectrum of the transformed data.

This transformation produces a resultant matrix containing relatively large values in a zone located towards the upper left part of the matrix and relatively small values elsewhere. The size of the zone containing the large values depends on the complexity of the image.

A normalization matrix is defined, based on a psychovisual analysis. This matrix is used to quantize the DCT coefficients which are significant from the visual point of view with a small quantization step, while a larger quantization step is used for the rest of the coefficients.

The quantization of the DCT coefficients is the principle mechanism of compression, but also of loss of information. The system increases the level of compression by effecting entropy coding of the output of the quantizer.

The normalization matrix can be scaled by means of a factor called the scale factor, which can take any real value whatsoever greater than zero. By modifying the value of this factor it is possible to modify the compression ratio given by the JPEG method. The larger the value of the scale factor, the greater becomes the compression ratio and vice versa.

The present invention defines an efficient way of finding this scale factor while making the minimum number of iterations, with a method which does not degrade the quality of the compressed image in any way.

The proposed process is based on the demonstration by the inventors that the relationship between the scale factor and the compression ratio obtained with the JPEG compression is of quasi-linear nature.

A first embodiment of the process is described below with reference to FIGS. 1 and 2.

As already mentioned, the invention relies on the discovery that it is possible to define a relation between the scale factor and the compression ratio of the image. This relationship can be represented graphically by putting the scale factor SF on the axis of the abscissae and the compression ratio CR on the axis of the ordinates.

This first embodiment of the process is based on a strictly linear model of the compression ratio as a function of the scale factor.

In a first step 10 of the process, the compression ratio finally to be attained is fixed. This ratio is called the specified compression ratio and is abbreviated to $CR_T$. It is represented by a straight line referenced 110 in FIGS. 2a to 2d. This ratio can be fixed either for good in the control system of the compression ratio, or by the user, in particular as function of the desired image quality, the number of images to be stored in a given memory or the capacity of a transmission channel.

In this same step 10 of the process, an initial scale factor $SF_1$ is defined. This initial scale factor is generally defined once and for all. According to the described embodiment of the process, the initial scale factor is fixed at 1.

The JPEG algorithm is used in a second step 11 to compress an input image, the actual compression ratio $CR_1$ being calculated in this same step.

In step 12 of the process, the relative error between the actually obtained compression ratio $CR_1$ and the specified compression ratio $CR_T$ is determined. If this relative error is lower than a predetermined threshold value, ±5% for example, the process is terminated and the image is stored or transmitted. This corresponds to the step 30 in FIG. 1. The difference between the specified compression ratio and the actual compression ratio is denoted $\Delta CR$ in FIG. 2d.

In the converse case, step 13 consists in defining a straight line representing the compression ratio as a function of the scale factor, this straight line modelling the actual curve of the compression ratio as a function of the scale factor. The straight line passes through a point $P_1$ having $SF_1=1$ as abscissa and $CR_1$ as ordinate. Its slope $m_0$ is defined in the control system for the compression ratio. This slope is determined as the mean slope of a set of test images.

The straight line can be written in the following manner:

$$CR = m_0 \cdot SF + b_0$$

where CR is the compression ratio, SF the scale factor and $b_0$ is the ordinate at the origin. This straight line has the reference 111 in FIGS. 2b, 2c and 2d.

The value of $b_0$ is given by:

$$b_0 = CR_1 - m_0 \cdot SF_1$$

The value of the scale factor corresponding to the compression ratio to be obtained is then determined in step 14 of the process, using the straight line defined above.

At the specified compression ratio we have:

$$CR_T = m_0 \cdot SF_2 + b_0$$

from which $$SF_2 = (CR_T - b_0)/m_0$$

This allows a new scale factor to be calculated as a function of the specified compression ratio and the actual compression ratio obtained in the first approximation.

At this stage of the process, the JPEG algorithm is used again with the scale factor $SF_2$. This corresponds to step 15 of FIG. 1. The actual compression ratio $CR_2$ is determined in this same step. This corresponds to FIG. 2c. A point $P_2$ having the coordinates $SF_2$ and $CR_2$ is illustrated in FIG. 2c.

In step 16, the value $CR_2$ obtained is compared with the value of the compression ratio $CR_T$. If their difference is less than 5% the process is terminated.

In the converse case, a model straight line passing through the point $P_1$ with $SF_1=1$ as abscissa and $CR_1$ as ordinate and through the point $P_2$ having $SF_2$ for abscissa and $CR_2$ for ordinate is used. This is effected in step 17. This straight line has the reference 112 in FIG. 2d. It has a slope $m_1$ given by:

$$m_1 = (CR_2 - CR_1)/(SF_2 - SF_1)$$

As above, a new model is defined:

$$CR = m_1 \cdot SF + b_1$$

in which:

$$b_1=CR_1-(m_1 \cdot SF_1)=CR_2-(m_1 \cdot SF_2)$$

At the specified point of the compression ratio $CR_T$, we have:

$$CR_T=m_1 \cdot SF_3+b_1$$

from which $$SF_3=(CR_T-b_1)/m_1$$

The determination of this value $SF_3$ is effected in step 18 of the process. The JPEG algorithm is used once again to obtain the actual compression ratio $CR_3$. This corresponds to step 19 in FIG. 1.

This actual compression ratio $CR_3$ is compared in step 20 with the specified compression ratio $CR_T$ and the process is terminated if these two levels have a difference less than a predetermined value.

In the converse case, the process is carried out using as a straight line approximation the straight line passing through the two last points having the calculated pairs of coordinates SF and CR.

The process is followed until the value of the actual compression ratio is within the acceptable limits for the specified compression ratio. This condition is generally realised after one to three iterations when the relative difference between the actual compression ratio and the specified compression ratio should be less than or equal to 5%. FIG. 2d further illustrates the actual curve of the compression ratio as a function of the scale factor. This curve has the reference 113.

Figure 3:
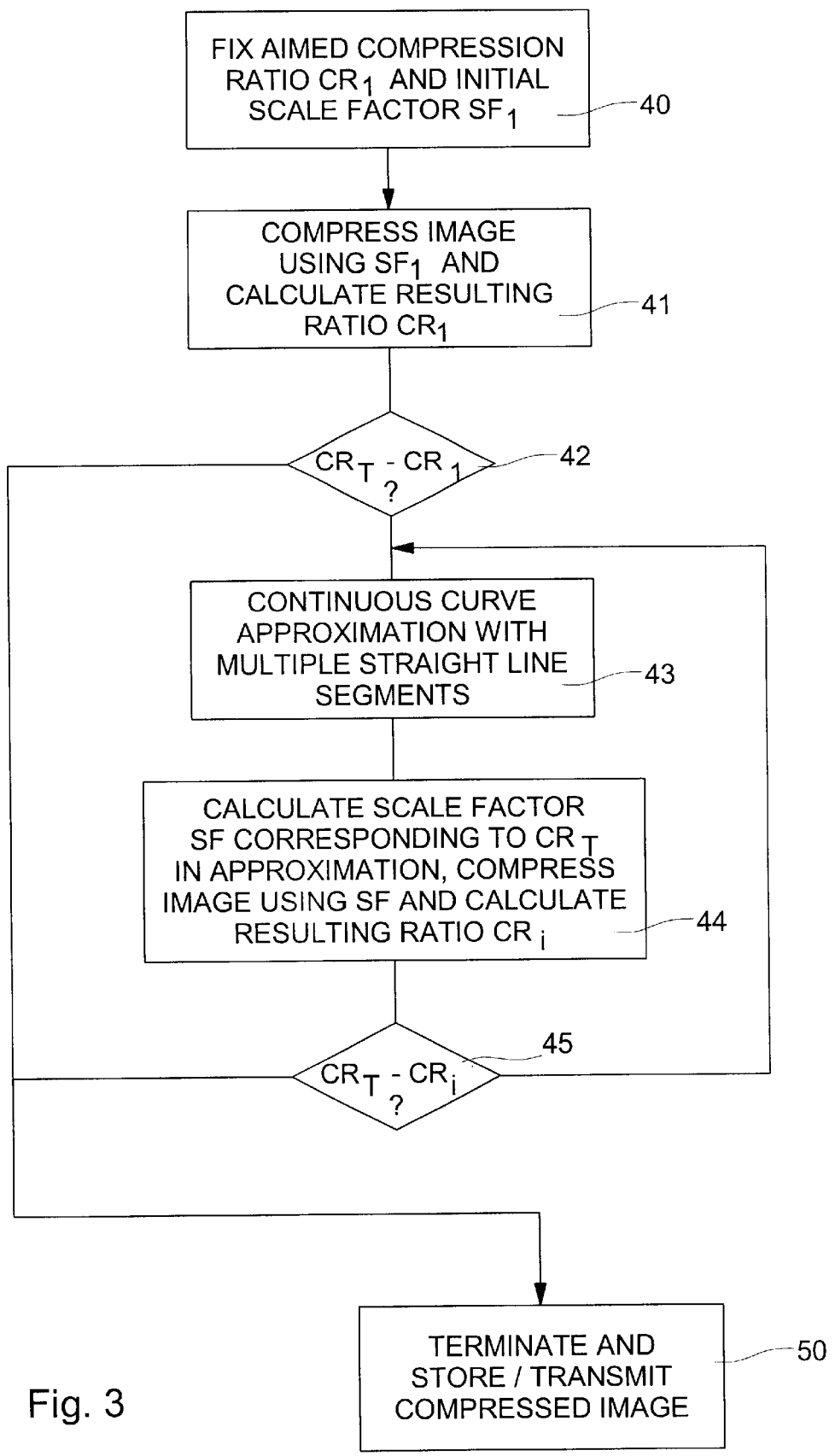

FIGS. 3 and 4 illustrate a second embodiment of the process according to the present invention, in which the number of iterations can be reduced. This objective is attained by starting the process as described above using an initial scale factor $SF_1=2$ and using a better approximation to the curve representing the compression ratio as a function of the scale factor.

In the embodiment illustrated by FIGS. 1 and 2, the compression ratio as a function of the scale factor is approximated by a straight line while in the embodiment illustrated by FIGS. 3 and 4 the compression ratio is approximated by straight line segments forming a continuous curve, the slope of each segment being different in the various zones of the scale factor as a function of the actual compression ratio obtained after an iteration using $SF_1$ as the scale factor.

The specified compression ratio $CR_T$ is introduced in a step 40.

In step 41 the actual compression ratio $CR_1$ is determined by applying the JPEG process with a given scale factor $SF_1$, equal to 2 for example.

In step 42 the value of $CR_1$ is compared with the specified value $CR_T$. If the relative error of these two values is lower than a predetermined threshold value, 5% for example, the process is terminated and the image is stored or transmitted. This corresponds to step 50. In the converse case, the process continues with the step described below.

The approximation to the curve of the compression ratio as a function of the scale factor allows zones with different slopes to be defined. Each zone is formed by a segment having a given slope. The value of the slope for each zone is selected as a function of the value of $CR_1$, in accordance with the equations $m=f(CR_1)$ of the table below, in which six zones forming six straight line segments are defined by way of example of a concrete implementation.

| Zone No. | Scale factor | Slope |
|---|---|---|
| 1 | sfSF < 1.0 | $m_1 = 0.4939\ CR_1 - 0.7964$ |
| 2 | $1.0 \leq sfSF < 1.5$ | $m_2 = 0.3947\ CR_1 - 0.3122$ |
| 3 | $1.5 \leq sfSF < 2.0$ | $m_3 = 0.2894\ CR_1 + 0.6244$ |
| 4 | $2.0 \leq sfSF \leq 5.0$ | $m_4 = 0.1565\ CR_1 + 1.6517$ |
| 5 | $5.0 < sfSF \leq 10.0$ | $m_5 = 0\ CR_1 + 3.0175$ |
| 6 | sfSF > 10 | $m_6 = -0.1098\ CR_1 + 3.8832$ |

The straight line which is the best adapted, i.e. that which best approximates the actual curve of the compression ratio as a function of the scale factor, is chosen as a function of the actual value of $CR_1$. This is effected in step 43 of the process illustrated in FIG. 3.

In step 44 the scale factor $SF_2$ which should correspond to the specified compression ratio $CR_T$ is then estimated, using the model of the segment given by the appropriate slope m and by the point $(CR_1, SF_1)$. The JPEG process is applied again using $SF_2$, which gives the compression ratio $CR_2$ as result.

According to step 45, if the relative error between the calculated ratio $CR_2$ and the specified compression ratio $CR_T$ is lower than a predetermined threshold level, for example ±5%, the process is terminated. In the converse case, a supplementary iteration of the process is effected.

The number of iterations depends on the desired precision. The process is terminated when the specified compression ratio is attained, within a limit dependent on this desired precision.

One particular embodiment is described with reference to FIGS. 4a to 4d. In this embodiment it is assumed that the scale factor being sought lies between 5 and 10.

The steps of the process are described below.

The specified compression ratio, abbreviated $CR_T$ as illustrated in FIG. 4a is given. This Figure also comprises a curve 200 representing the compression ratio as a function of the scale factor.

The input image is compressed using a scale factor equal to 2. The resultant compression ratio is called $CR_1$ (see FIG. 4a).

If the absolute value of the relative error between $CR_T$ and $CR_1$ is smaller that a predetermined threshold value, for example 5%, the process is terminated. In the converse case, it proceeds.

The slope of the straight line approximating the compression ratio as a function of the scale factor is then determined using the above table. In the above example, the desired scale factor corresponds to the zone No. 5 in which 5<SF<10. However, starting from the point (2, $CR_1$) the zone No. 4 of the table is used at first. With the value of $m_4$ and the point ($SF_1=2$, $CR_1$), the ordinate at the origin $b_4$ is implicitly defined, as with a linear model $CR=m_4 \cdot SF+b_4$ with the reference 201. This linear model is then used to find the scale factor which corresponds to a compression ratio $CR=CR_T$. This scale factor is called $SF_2$ (see FIG. 4a).

In the illustrated case, $SF_2>5$. The linear model 201 is then used, $CR=m_4 \cdot SF+b_4$ to find the compression ratio CR which corresponds to a scale factor SF=5. This step determines the point $(5, CR_y)$—(see FIG. 4b).

The value of $CR_1$ is then inserted in the zone No. 5 of the table above to find the slope $m_5$ of the linear model for the region 5<SF<10. This model has the reference 202 in FIG. 4b. Given the value of $m_5$ and the point $(5, CR_y)$, the value of $b_5$ is implicitly defined, as in the linear model $CR=m_5 \cdot SF+b_5$.

This model is then used to find the scale factor which corresponds to a compression ratio $CR=CR_T$. This scale factor is called $SF_2$. The preceding value of $SF_2$ becomes $SF_2'$.

The input image is then compressed using the normalization matrix scaled by the value $SF_2$. $CR_2$ is called the resultant compression ratio (see FIG. 4c).

If the absolute value of the relative error between $CR_T$ and $CR_2$ is smaller than a predetermined threshold value, for example 5%, the process is terminated. Otherwise it is continued.

In order to approximate more precisely to the value of $CR_T$, an adjustment of the ordinate at the origin $b_5$ is then necessary. The slope $m_5$ and the point $(SF_2, CR_2)$ implicitly define a more accurate model $CR=m_5 \cdot SF+b_5'$ of the characteristic of the compression ratio as a function of the scale factor of the input image. The scale factor which corresponds to a compression ratio $CR=CR_T$ is determined with this new model. This scale factor is called $SF_3$.

Finally, using $SF_3$ as the scale factor for the normalization matrix, the input image is compressed. $CR_3$ is called the resultant compression ratio (see FIG. 4d). If the relative error between $CR_3$ and $CR_T$ is lower than a predetermined threshold value, the process is terminated. In the converse case, the process is continues in a similar fashion to what has been described above.

Although the basic principle used in this variant is equivalent to the principle of the process explained above, the specified value $CR_T$ of the compression ratio is attained more rapidly than in the preceding embodiment.

The process according to the invention allows the compression ratio to be chosen and thus to select the memory space necessary for storing an image, or the transmission time required.

This choice of the compression ratio can be effected by the user or be predefined during the design of the coding system for several values of the compression ratio, in such a way that it cannot be modified.

The present invention is not limited to the described embodiments but extends to all variants obvious to the man skilled in the art. In particular, the initial scale factor can be modified in such a way as to arrive at the desired result as rapidly as possible. Equally, the modelling of the curve of the compression ratio as a function of the scale factor can be refined. Moreover, the tolerance for the value of the compression ratio can be chosen as a function of the required precision.

More particularly, the description of the invention which has been given refers to the case in which the specified compression ratio can be chosen within a range of values corresponding to the largest number of possible applications of the system. However, if the specified compression ratio is restricted to some previously defined and constant values, the relationships of the scale factor to the compression ratio can be optimised, while remaining within the scope of the invention, so as to reduce to 2 the number of iterations which the system requires to converge on the specified compression ratio.

What is claimed is:

1. A process for controlling the compression ratio of digital images, comprising the steps of:
    a) compressing a digital image by means of a conventional process which has at least one parameter serving to modify the compression ratio,
    b) calculating the compression ratio of the said conventional process,
    c) verifying whether the calculated compression ratio lies in a range of tolerance of the value of a specified compression ratio,
    d) modifying the said parameter if the calculated compression ratio does not lie in the range of tolerance,
    e) again compressing the image by means of the said process, using the modified parameter,
    f) again verifying whether the calculated compression ratio lies in the range of tolerance of the specified compression ratio, and
    g) repeating the steps d) to f) until the calculated compression ratio lies in the range of tolerance,
    wherein:
        the said compression process is the JPEG process,
        the said parameter is a scale factor serving to modify the values of the normalization matrix used by the algorithm of the JPEG process,
        the step a) is effected using an initial scale factor, and
        the modification of the scale factor at step d) is effected on the basis of an approximation of the curve representing the compression ratio as a function of the scale factor, said approximation being effected by a single straight line.

2. The process according to claim 1, wherein the scale factor is:
    a) increased when the calculated compression ratio is lower than the specified compression ratio, and
    b) reduced when the calculated compression ratio is higher than the specified compression ratio.

3. A process for controlling the compression ratio of digital images, comprising the steps of:
    a) compressing a digital image by means of a conventional process which has at least one parameter serving to modify the compression ratio,
    b) calculating the compression ratio of the said conventional process,
    c) verifying whether the calculated compression ratio lies in a range of tolerance of the value of a specified compression ratio,
    d) modifying the said parameter if the calculated compression ratio does not lie in the range of tolerance,
    e) again compressing the image by means of the said process, using the modified parameter,
    f) again verifying whether the calculated compression ratio lies in the range of tolerance of the specified compression ratio, and
    g) repeating the steps d) to f) until the calculated compression ratio lies in the range of tolerance,
    wherein:
        the said compression process is the JPEG process,
        the said parameter is a scale factor serving to modify the values of the normalization matrix used by the algorithm of the JPEG process,
        the step a) is effected using an initial scale factor, and
        the modification of the scale factor at step d) is effected on the basis of an approximation of the curve representing the compression ratio as a function of the scale factor, said approximation being effected by straight line segments having different slopes and forming a continuous curve.

4. The process according to claim 3, wherein the straight line segments forming the continuous curve are defined for predetermined scale factor zones and wherein a predetermined slope for each straight line segment is defined in each of said predetermined scale factor zones.

5. The process according to claim 3, wherein the slope of each straight line segment is a function of the compression ratio calculated on the basis of said initial scale factor.

6. The process according to claim 3, wherein the scale factor is:

a) increased when the calculated compression ratio is lower than the specified compression ratio, and b) reduced when the calculated compression ratio is higher than the specified compression ratio.

7. A process for controlling the compression ratio of digital images comprising the steps of:

a) compressing a digital image by means of the JPEG process using a selected scale factor and calculating the corresponding compression ratio, b) verifying whether the calculated compression ratio lies in a range of tolerance of the value of a specified compression ratio, c) terminating the process if the calculated compression ratio lies in the said range of tolerance, d) if the calculated compression ratio does not lie in the said range, approximating the curve representing the compression ratio as a function of the scale factor by a straight line having a given slope and passing through a first point having as coordinates the selected scale factor and corresponding calculated compression ratio of step a), e) determining a new scale factor on the basis of the said straight line and the specified compression ratio, f) repeating steps a) to e) using the new scale factor determined at step e) as the selected scale factor until the corresponding calculated compression ratio lies in the said range of tolerance, wherein, during an initial iteration of the process where steps a) to e) are performed for the first time, the selected scale factor is selected to be a given initial scale factor and the said straight line is defined at step d) as a straight line having a predetermined slope and passing through said first point having as coordinates the said initial scale factor and corresponding calculated compression ratio, wherein, during subsequent iterations of the process where steps a) to e) are repeated, the said straight line is defined at step d) as a straight line passing through said first point and through a second point having as coordinates the selected scale factor and corresponding calculated compression ratio of step a) of a preceding iteration.

8. The process according to claim 7, wherein said predetermined slope is determined as the mean slope of a set of test images.

9. A process for controlling the compression ratio of digital images comprising the steps of:

a) compressing a digital image by means of the JPEG process using a selected scale factor and calculating the corresponding compression ratio, b) verifying whether the calculated compression ratio lies in a range of tolerance of the value of a specified compression ratio, c) terminating the process if the calculated compression ratio lies in the said range of tolerance, d) if the calculated compression ratio does not lie in the said range, approximating the curve representing the compression ratio as a function of the scale factor by a continuous curve formed of straight line segments of different slopes, a first of said straight line segments forming the continuous curve having a predetermined slope ($m_1$ to $m_6$) and passing through a first point having as coordinates the selected scale factor and corresponding calculated compression ratio of step a), e) determining a new scale factor on the basis of the said continuous curve and the specified compression ratio, f) repeating steps a) to e) using the new scale factor determined at step e) as the selected scale factor until the corresponding calculated compression ratio lies in the said range of tolerance, wherein, during an initial iteration of the process where steps a) to e) are performed for the first time, the selected scale factor is selected to be a given initial scale factor.

10. The process according to claim 9, wherein the straight line segments forming the continuous curve are defined for predetermined scale factor zones and wherein a predetermined slope for each straight line segment is defined in each of said predetermined scale factor zones.

11. The process according to claim 9, wherein the slope of each straight line segment is a function of the compression ratio calculated on the basis of said initial scale factor.

* * * * *